United States Patent
Marquardt et al.

(10) Patent No.: US 9,509,587 B1
(45) Date of Patent: Nov. 29, 2016

(54) HARDWARE ROOT OF TRUST (HROT) FOR INTERNET PROTOCOL (IP) COMMUNICATIONS

(71) Applicant: Sprint Communications Company L.P., Overland Park, KS (US)

(72) Inventors: Ronald R. Marquardt, Woodinville, WA (US); Lyle Walter Paczkowski, Mission Hills, KS (US); Arun Rajagopal, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 69 days.

(21) Appl. No.: 14/662,870

(22) Filed: Mar. 19, 2015

(51) Int. Cl.
*H04L 12/751* (2013.01)
*H04L 29/06* (2006.01)
*H04L 12/721* (2013.01)
*H04L 12/801* (2013.01)
*H04L 29/12* (2006.01)
*H04L 12/713* (2013.01)
(Continued)

(52) U.S. Cl.
CPC ........... *H04L 45/02* (2013.01); *H04L 29/0653* (2013.01); *H04L 45/38* (2013.01); *H04L 45/586* (2013.01); *H04L 45/66* (2013.01); *H04L 45/74* (2013.01); *H04L 47/10* (2013.01); *H04L 49/70* (2013.01); *H04L 61/2007* (2013.01)

(58) Field of Classification Search
CPC .... G06F 12/1408; G06F 21/00; G06F 21/60; G06F 21/71–21/73; Y10S 707/99931; Y10S 707/99939; H04W 12/02; H04W 12/06; H04W 12/08; H04W 48/08; H04W 48/16; H04L 9/006; H04L 9/083; H04L 9/0877; H04L 9/3213; H04L 9/3263; H04L 9/3271; H04L 41/28; H04L 63/00; H04L 63/0485; H04L 63/062; H04L 63/08; H04L 63/0823; H04L 63/1433; H04L 2209/60; H04L 29/0653; H04L 45/02; H04L 45/38; H04L 45/66; H04L 45/74; H04L 45/586; H04L 47/10; H04L 49/70; H04L 61/2007; H04M 7/0078; G09C 1/00
See application file for complete search history.

(56) References Cited

U.S. PATENT DOCUMENTS

| 7,729,292 | B2 | 6/2010 | Cheshire et al. |
| 8,533,828 | B2 * | 9/2013 | Mendonca .......... H04L 63/0272 709/226 |
| 9,317,708 | B2 * | 4/2016 | Lee ..................... G06F 21/6218 |

(Continued)

FOREIGN PATENT DOCUMENTS

| WO | 2014110453 | 7/2014 |
| WO | 2014125486 | 8/2014 |

*Primary Examiner* — Tri H Phan

(57) ABSTRACT

A communication system determines Hardware Root-of-Trust (HRoT) trust for Internet Protocol (IP) communications. A probe transfers probe packets having an originating IP address, destination IP address, and IP HRoT reporting parameter. IP routers receive the probe packets through input interfaces and route the probe packets from the input interfaces to output interfaces. Responsive to the IP HRoT reporting parameter, the IP routers encode router Hardware Identifiers (HW IDs) for transfer in probe responses to the probe system. The probe responses indicate the encoded router HW IDs, IP input interfaces, and IP output interfaces. The probe system processes the probe responses to identify an end-to-end IP communication path for the originating IP address and destination IP address based on the IP interfaces. The network probe system determines hardware trust status for the end-to-end IP communication path based on the encoded IP router HW IDs.

20 Claims, 9 Drawing Sheets

(51) Int. Cl.
*H04L 12/931* (2013.01)
*H04L 12/741* (2013.01)

(56) References Cited

U.S. PATENT DOCUMENTS

| | | | |
|---|---|---|---|
| 2006/0143304 A1 | 6/2006 | Bodlaender et al. | |
| 2008/0005562 A1* | 1/2008 | Sather | H04L 9/006 713/168 |
| 2008/0232269 A1 | 9/2008 | Tatman et al. | |
| 2009/0204964 A1* | 8/2009 | Foley | G06F 21/53 718/1 |
| 2010/0274550 A1 | 10/2010 | Chou et al. | |
| 2012/0102334 A1* | 4/2012 | O'Loughlin | G06F 21/57 713/189 |
| 2013/0061293 A1* | 3/2013 | Mao | G06F 21/53 726/4 |
| 2014/0201374 A1 | 7/2014 | Ashwood-Smith et al. | |
| 2014/0229945 A1 | 8/2014 | Barkai et al. | |
| 2014/0241247 A1 | 8/2014 | Kempf et al. | |

* cited by examiner

HARDWARE ROOT OF TRUST (HROT) FOR INTERNET PROTOCOL (IP) COMMUNICATIONS

TECHNICAL BACKGROUND

Internet Protocol (IP) communication systems transfer IP packets among user devices and intelligent machines to provide data communication services like internet access, file transfers, media streaming, and user messaging. The IP communication systems are implementing several technologies in a contemporaneous manner to improve service delivery. These technologies include systems for Hardware Root-of-Trust (HRoT), Network Function Virtualization (NFV), and Software-Defined Networks (SDNs).

The HRoT systems ensure network security and control. The HRoT systems maintain physical separation between trusted hardware and untrusted hardware. The HRoT systems control software access to the trusted hardware but allow interaction between open and trusted software components through secure bus interfaces, memories, and switching circuits. The HRoT systems establish HRoT with one another by using secret HRoT keys physically embedded in their hardware to generate hash results for remote verification by other HRoT systems that know the secret HRoT keys and hash algorithms.

The NFV systems increase capacity and efficiency. NFV computer platforms run hypervisor software to execute various software modules during sets of processing time cycles—referred to as NFV time slices. The software modules often comprise virtual machines, such as virtual IP routers, Layer 2 switches, and the like. Different networks are mapped to different NFV time slices to isolate the networks from one another.

The SDN systems improve service provisioning and management. SDNs have separate control and data planes. SDN controllers interact with SDN applications to control SDN data plane machines. The SDN applications process application-layer data to direct the SDN controllers, and in response, the SDN controllers direct the SDN data plane machines to process and transfer IP packets. The SDN applications may comprise gateways, servers, and the like.

Unfortunately, the HRoT systems, NFV systems, and SDN systems are not effectively integrated together within IP communication networks.

TECHNICAL OVERVIEW

A communication system determines Hardware Root-of-Trust (HRoT) trust for Internet Protocol (IP) communications. A probe transfers probe packets having an originating IP address, destination IP address, and IP HRoT reporting parameter. IP routers receive the probe packets through input interfaces and route the probe packets from the input interfaces to output interfaces. Responsive to the IP HRoT reporting parameter, the IP routers encode router Hardware Identifiers (HW IDs) for transfer in probe responses to the probe system. The probe responses indicate the encoded router HW IDs, IP input interfaces, and IP output interfaces. The probe system processes the probe responses to identify an end-to-end IP communication path for the originating IP address and destination IP address based on the IP interfaces. The network probe system determines hardware trust status for the end-to-end IP communication path based on the encoded IP router HW IDs.

DETAILED DESCRIPTION

Figure 1:
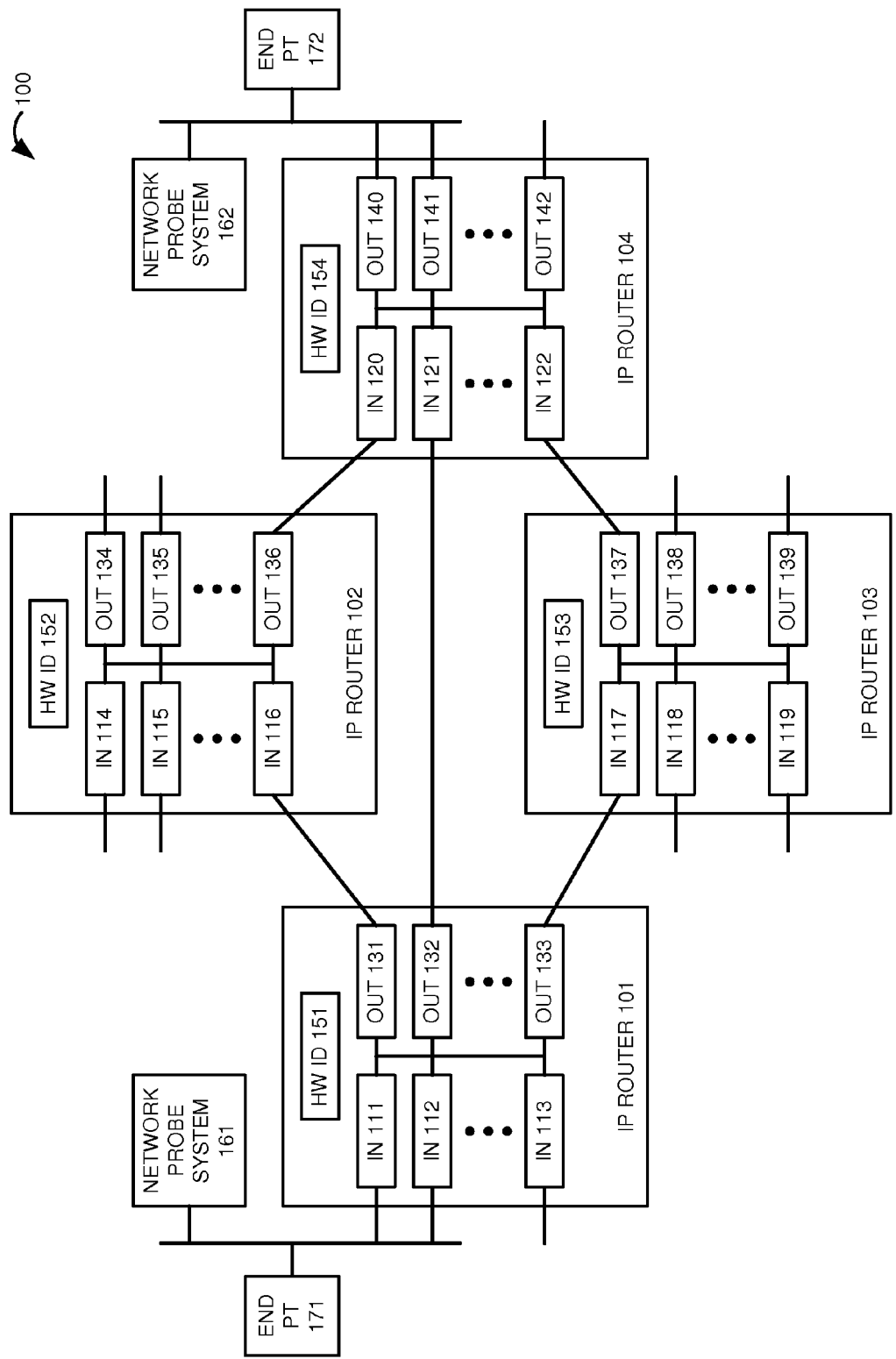
FIGS. 1-3 illustrate a data communication system to verify Hardware Root-of-Trust (HRoT) for Internet Protocol (IP) communication paths that traverse IP routers.
Figure 2:
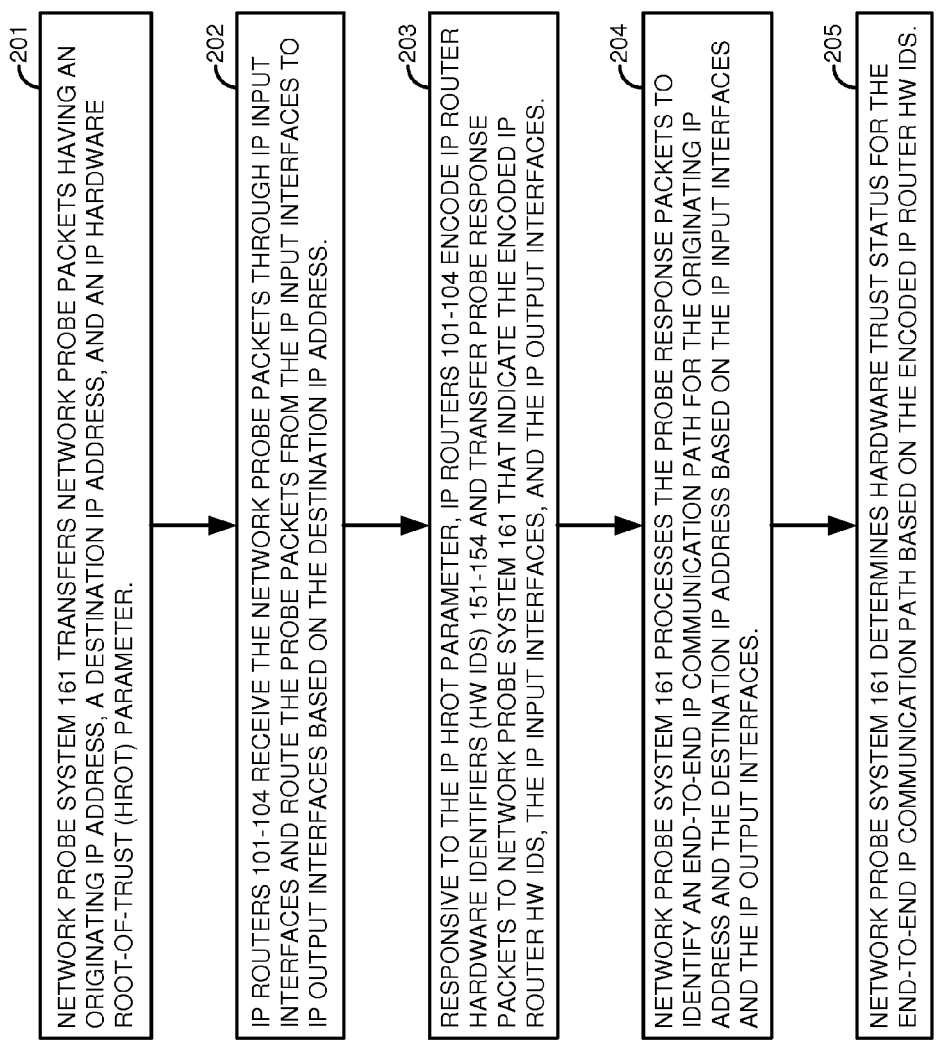
Figure 3:
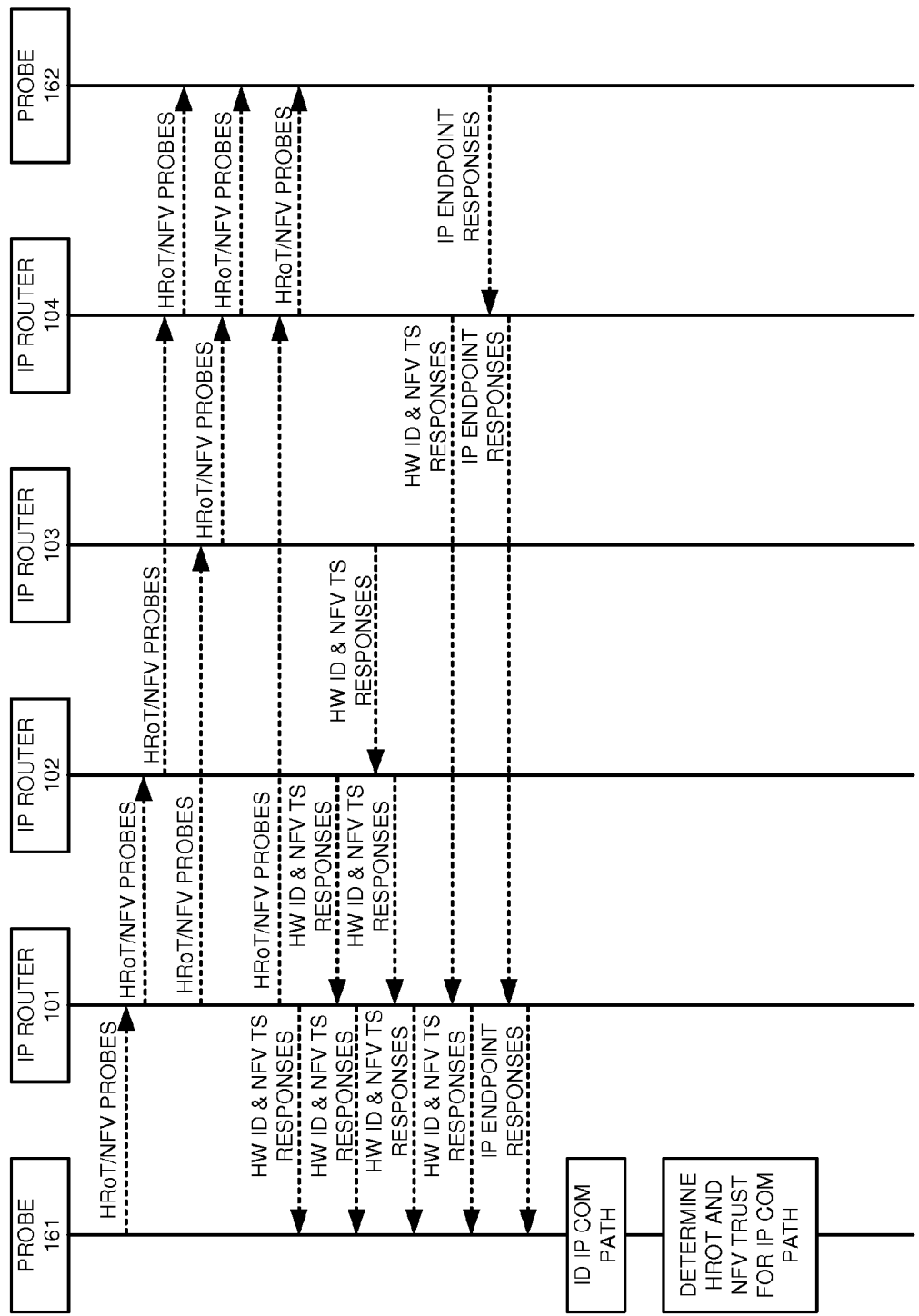

FIGS. 1-3 illustrate data communication system 100 to verify Hardware Root-of-Trust (HRoT) for Internet Protocol (IP) communication paths. In some examples, data communication system 100 also verifies proper Network Function Virtualization (NFV) time slices for the IP communication paths. Data communication system 100 comprises IP routers 101-104 and network probe systems 161-162. IP routers 101-104 include respective IP input interfaces 111-122 and IP output interfaces 131-142. IP routers 101-104 also include respective Hardware Identifiers (HW IDs) 151-154.

IP interfaces 111-122 and 131-142 comprise physical Layer 2 connections such as Ethernet, Software-Defined Network (SDN), Long Term Evolution (LTE), Data Over Cable Service Interface Specification (DOCSIS), Time Division Multiplex (TDM), Synchronous Optical Network (SONET), or some other data link interface. In NFV environments, the physical Layer 2 connection comprises virtual IP links over physical NFV server circuitry. Input interfaces 111-112 in IP router 101 are coupled to network probe system 161 and IP end-point 171 over Layer 2 communication systems. Output interfaces 140-141 in IP router 104 are coupled to network probe system 162 and IP end-point 172 over Layer 2 communication systems.

IP end-points 171-172 comprise computers, servers phones, or some other type of intelligent machine. Network probe systems 161-162 comprise computer systems that are also IP-end-points. IP routers 101-104 comprise computer systems that are coupled to one another over Layer 2 communication systems. One or more of IP routers 101-104, network probe systems 161-162, and IP-end-points 171-172 may be virtual machines executing on NFV computer systems. In particular, output interface 131 in IP router 101 is coupled to input interface 116 in IP router 102. Output interface 132 in IP router 101 is coupled to input interface 121 in IP router 104. Output interface 133 in IP router 101 is coupled to input interface 117 in IP router 103. Output interface 136 in IP router 102 is coupled to input interface 120 in IP router 104. Output interface 137 in IP router 103 is coupled to input interface 122 in IP router 104.

IP routers 101-104 share and maintain routing information. IP routers 101-104 receive IP packets having IP addresses into input interfaces 111-122. IP routers 101-104 transfer the IP packets from input interfaces 111-122 to output interfaces 131-142 over internal communication circuitry based on the IP packet addresses and the routing information. Thus, end-point systems 171 may obtain IP addresses and use these IP addresses to exchange IP packets over an end-to-end IP communication path formed by IP routers 101-104.

IP routers 101-104 execute HRoT software to establish and maintain hardware trust for their circuitry, memory, and communication interfaces. For example, IP router 101 reads its physically-embedded HW ID 151 and generates a trust value using a one-way hash on HW ID 151 and a random number. IP router 101 transfers the trust value to network probe system 161. Network probe system 161 then remotely verifies HRoT for IP router 101 by generating its own trust value with HW ID 151 and the random number.

Data communication system 100 performs an IP probe process before IP address pairs are used, on-demand, by schedule, or on some other basis. For example, probe systems 161-162 may comprise a Dynamic Host Configuration Protocol (DHCP) system that probes for HRoT using the same IP address prefixes as endpoints 171-172. To initiate the probe process, network probe system 161 transfers network IP probe packets that have an originating IP address, a destination IP address, and an IP HRoT reporting parameter. In some examples, the IP HRoT reporting parameter comprises a particular IP destination port number and/or IP source port number. In other examples, the IP HRoT reporting parameter comprises a special IP HRoT. The HRoT reporting parameter may also comprise a flag or value placed in the IP header portion of the probe packets.

IP router 101 receives the network probe packets through IP input interfaces 111-112 and routes the probe packets from IP input interfaces 111-112 to IP output interfaces 131-133 based on the IP addresses and its routing information. Note that the probe packets having the same address pairs take different physical routes based on variables in the routing information. For example, output interface 132 may become heavily loaded, so router 101 begins to use output interfaces 131 and 133 to handle the traffic burst.

Responsive to the IP HRoT reporting parameter, IP router 101 encodes its HW ID 151 and transfers a probe response packet to network probe system 161 that indicate encoded HW ID 151 for IP router 101. The probe response packet also indicates the IP addresses, IP input interfaces 111-112, and IP output interfaces 131-133 that were used to transfer the network probe packets having the HRoT reporting parameter.

In a similar manner, IP routers 102-104 receive the network probe packets through IP input interfaces 116-117 and 120-122 and route the probe packets to IP output interfaces 136-137 and 140-141 based on the IP addresses and routing information. Responsive to the IP HRoT reporting parameter, IP routers 102-104 encode their HW IDs 152-154 and transfer probe response packets to network probe system 161 that indicate encoded HW IDs 152-154 for IP routers 102-104. The probe response packets also indicate the IP addresses, IP input interfaces 116-117 and 120-122, and IP output interfaces 136-137 and 140-141 that were used to transfer the network probe packets. Network probe system 162 also receives the network probe packets from IP output interfaces 140-141, and responsive to the IP HRoT reporting parameter, returns a probe response packet to network probe system 161 indicating that the IP end-point has been reached.

Network probe system 161 processes the probe response packets to identify an end-to-end IP communication path for the originating IP address and the destination IP address based on IP input interfaces 111-112, 116-117, and 120-122 and IP output interfaces 131-133, 136-137, and 140-141. Network probe system 161 then determines hardware trust status for the end-to-end IP communication path formed by interfaces 111-112, 116-117, 120-122, 131-133, 136-137, and 140-141 based on the encoded IP router HW IDs 151-154 for the associated IP routers 101-104.

Network probe system 161 uses network topology data to associate the specific input and output interfaces with their routers and their external Layer 2 connections. For example, the network topology data would associate output interface 131 with IP router 101 and with input interface 116 based on the Layer 2 data link. The topology data would associate input interface 116 with router 102. The network topology data may also be used to verify hardware trust. For example, network probe system 161 can verify that all reported IP output interfaces are coupled to one of the reported IP input interfaces or to an IP endpoint. If network probe system 161 detects that one of the reported IP output interfaces is not properly coupled (like if output interface 139 was reported), then network probe system 161 could determine that the IP communications path using the IP addresses is untrusted at the hardware level.

In some examples, Layer 2 devices like Ethernet switches and SDN IP flow controllers also report their HW IDs and input/output interfaces for the probe packets responsive to the HRoT reporting parameter. Network probe system 161 then determines HRoT for the IP communication path at Layer 2 in addition to Layer 3.

In some examples, network probe system 161 transfers an NFV reporting parameter in the network IP probe packets along with the HRoT reporting parameter. The NFV reporting parameter may also comprise or share a particular IP destination port number and/or IP source port number. IP routers 101-104 receive the network probe packets, and responsive to the NFV reporting parameter, IP routers 101-104 identify their NFV time slices used to transfer the network probe packets. IP routers 101-104 transfer their NFV time-slice data for the IP address pair in the probe response packets to network probe system 161.

Network probe system 161 processes the probe response packets to verify the proper NFV time slices for the end-to-end IP communication path for the originating IP address and the destination IP address. Typically, network probe system 161 uses network topology data to associate the routers and their target NFV time slices. If network probe system 161 identifies a reported NFV time slice that is not a proper target slice, then network probe system 161 determines that the IP communications path using the IP addresses is untrusted at the NFV level.

Referring to FIG. 2, an exemplary operation of data communication system 100 is described. Network probe system 161 transfers network IP probe packets that have an originating IP address, a destination IP address, and an IP HRoT reporting parameter (201). IP routers 101-104 receive the network probe packets through their IP input interfaces and route the probe packets to their IP output interfaces based on at least the destination IP address (202). Responsive to the IP HRoT reporting parameter, IP routers 101-104 encode their Hardware IDs (HW IDs) and transfer probe response packets to network probe system 161 that indicate the encoded HW IDs for IP routers 101-104. The probe response packets also indicate the IP input interfaces and the IP output interfaces that were used to transfer the network probe packets having the HRoT reporting parameter (203). In some examples, network probe system 162 receives the network probe packets and returns probe response packets to network probe system 161 indicating that the IP end-point has been reached.

Network probe system 161 processes the probe response packets to identify an end-to-end IP communication path for the originating IP address and the destination IP address based on the IP input interfaces and the IP output interfaces (204). Network probe system 161 determines hardware trust status for the end-to-end IP communication path formed by the input and output interfaces based on the encoded HW IDs for IP routers 101-104 (205).

Referring to FIG. 3, another exemplary operation of data communication system 100 is described, although system 100 may vary from this example. Network probe system 161 performs an HRoT/NFV process on IP address pairs. For example, network probe system 161 may verify HRoT and NFV trust for all IP address pairs in an IP address block before individual address are allocated from the block (and current IP addresses are de-allocated for HRoT and NFV verification).

To initiate the probe process, network probe system 161 transfers network IP probe packets that have an originating IP address and port number and a destination IP address and port number, where the port number combination represents an HRoT and NFV reporting parameter to IP routers 101-104. IP router 101 receives the network probe packets routes the probe packets to routers 102-104 based on the IP addresses and routing information. Responsive to the IP HRoT/NFV reporting parameters, IP router 101 encodes its HW ID and transfers probe response packets to network probe system 161 that indicate encoded HW ID for IP router 101. The probe response packets also indicate the IP addresses, communication interfaces, and NFV Time Slices (TS) used by router 101 to transfer the network probe packets.

IP router 102 receives some of the network probe packets and routes the probe packets to router 104 based on the IP addresses and routing information. Responsive to the IP HRoT/NFV reporting parameters, IP router 102 encodes its HW ID and transfers probe response packets to network probe system 161 that indicate encoded HW ID for IP router 102. The probe response packets also indicate the IP addresses, communication interfaces, and NFV Time Slices (TS) used by router 102 to transfer the network probe packets.

IP router 103 receives some of the network probe packets and routes the probe packets to router 104 based on the IP addresses and routing information. Responsive to the IP HRoT/NFV reporting parameters, IP router 103 encodes its HW ID and transfers probe response packets to network probe system 161 that indicate encoded HW ID for IP router 102. The probe response packets also indicate the IP addresses, communication interfaces, and NFV Time Slices (TS) used by router 103 to transfer the network probe packets.

IP router 104 receives the network probe packets and routes the probe packets to network probe system 162 based on the IP addresses and routing information. Responsive to the IP HRoT/NFV reporting parameters, IP router 104 encodes its HW ID and transfers probe response packets to network probe system 161 that indicate encoded HW ID for IP router 104. The probe response packets also indicate the IP addresses, communication interfaces, and NFV Time Slices (TS) used by router 104 to transfer the network probe packets.

Network probe system 162 also receives the network probe packets from router 104 and returns probe response packets network probe system 161 indicating that the IP end-point has been reached.

Network probe system 161 processes the probe response packets to identify an end-to-end IP communication path for the originating IP address and the destination IP address based on the reported IP input and output interfaces. Network probe system 161 determines the hardware trust status for the end-to-end IP communication path based on the HW IDs for IP routers 101-104 and the IP end-point reached messages.

Network probe system 161 uses network topology data to associate the specific input and output interfaces with their routers and their inter-router connections. The network topology data is used to verify hardware trust. For example, network probe system 161 can use the topology data to verify that all reported IP output interfaces are linked to a reported input interface or endpoint. If network probe system 161 detects that a reported IP output interface does not have a proper termination, then network probe system 161 determines that the IP communications path using the IP addresses is untrusted at the hardware level.

Network probe system also compares the NFV time slice data for routers 101-104 to target NFV time slices in the network topology data. If network probe system 161 detects that an improper time slice has been used, then network probe system 161 determines that the IP communications path using the IP addresses is untrusted at the NFV level.

Figure 4:
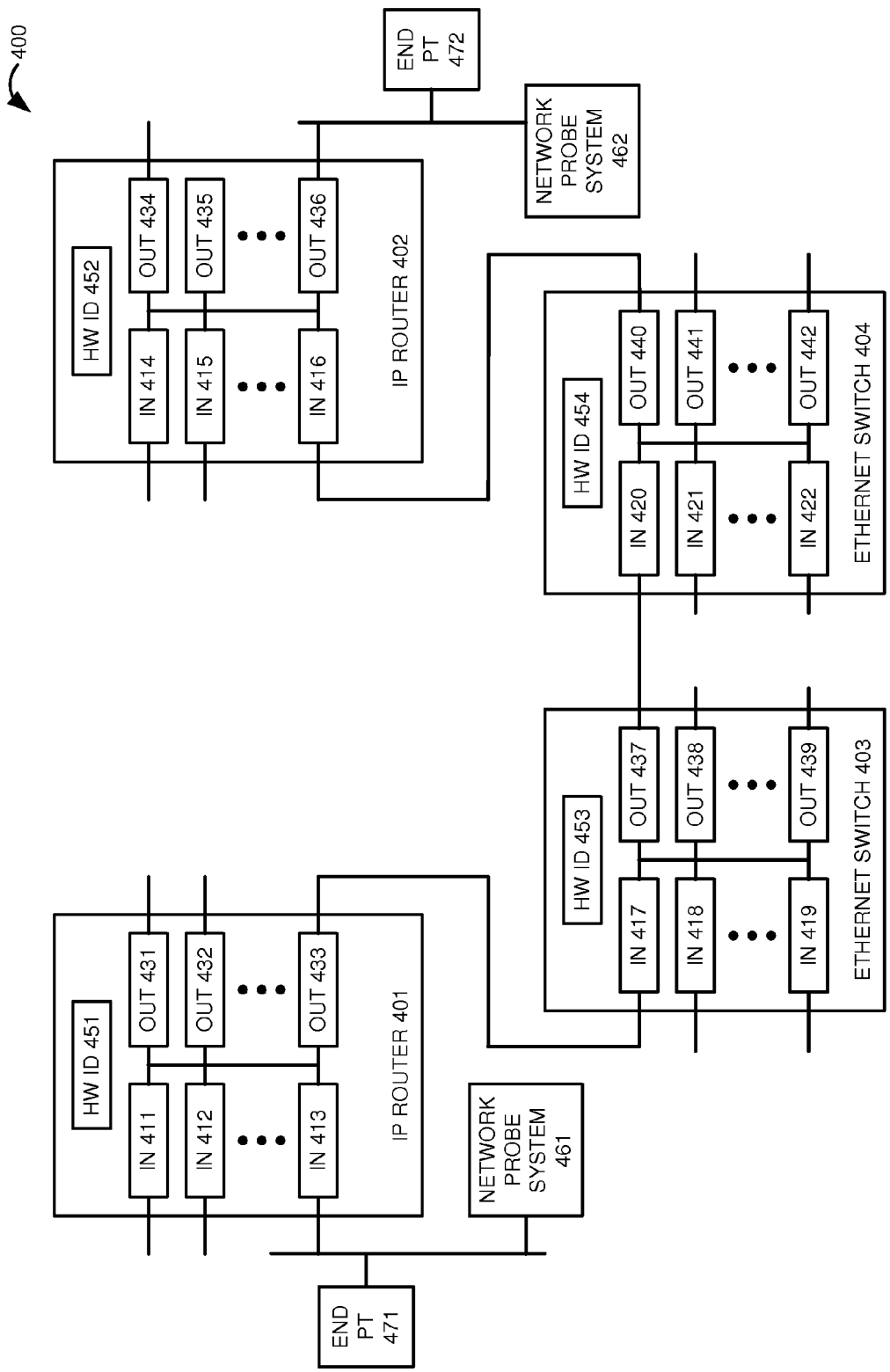
FIGS. 4-5 illustrate a data communication system to integrate HRoT for IP communication paths that traverse IP routers and Ethernet switches.
Figure 5:
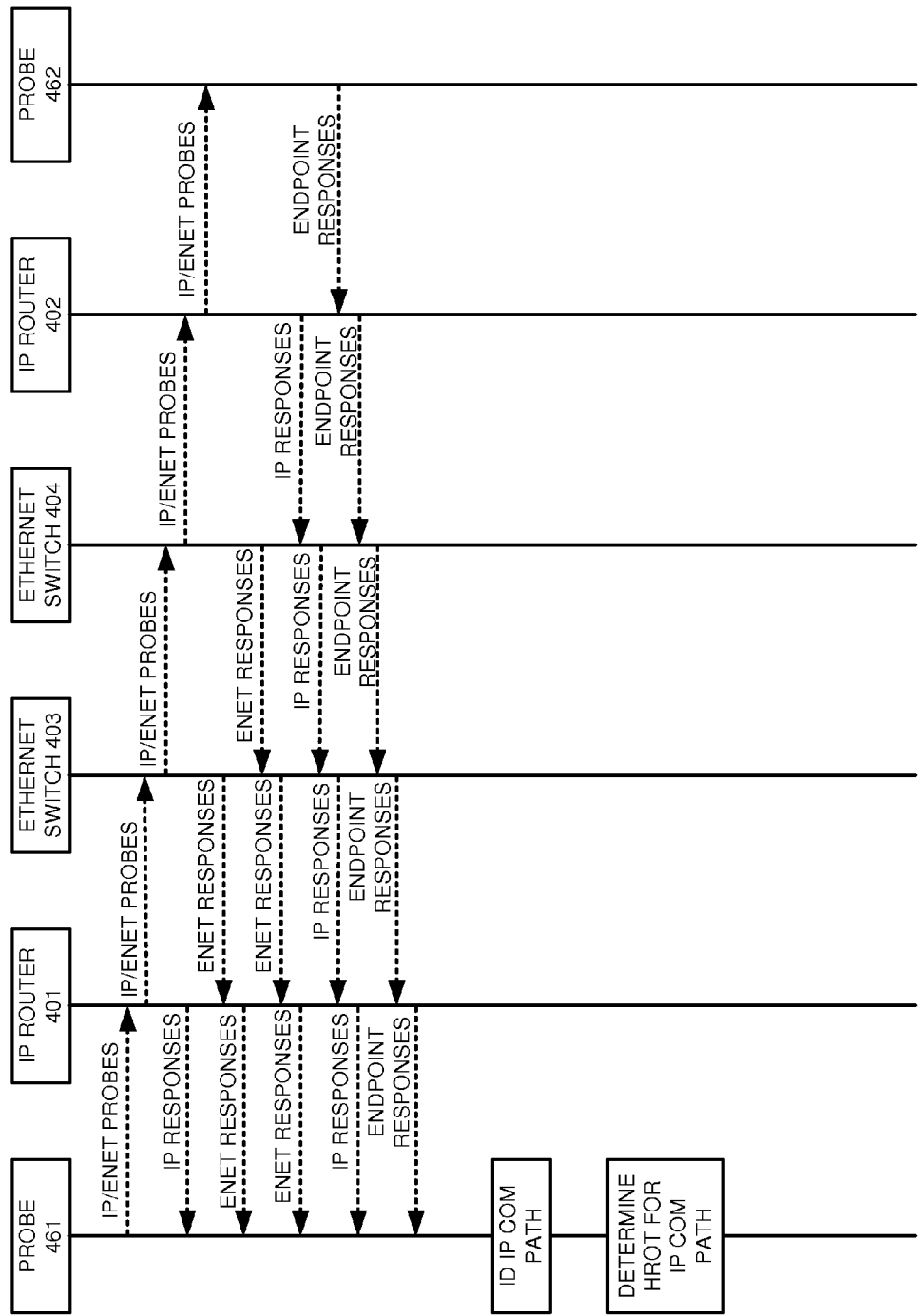

FIGS. 4-5 illustrate data communication system 400 to integrate HRoT for IP communication paths that traverse IP routers 401-402 and Ethernet switches 403-404. Data communication system 400 comprises IP routers 401-402, Ethernet switches 403-404, and network probe systems 461-462. IP routers 401-402 include respective IP input interfaces 411-416 and IP output interfaces 431-436. IP routers 101-102 also include respective HW IDs 451-452. IP routers 401-402 may be virtual machines or containers executing in an NFV environment. Ethernet switches 403-404 include respective Ethernet input interfaces 417-422 and Ethernet output interfaces 437-442. Ethernet switches 403-404 also include respective HW IDs 453-454. Ethernet interfaces 417-422 and 437-442 comprise physical Ethernet ports having Layer 1 connections like metal or glass.

Network probe system 461 is coupled to input IP interface 413 in IP router 401. Output IP interface 433 in IP router 401 is coupled to input Ethernet interface 417 in Ethernet switch 403. Output Ethernet interface 437 in Ethernet switch 403 is coupled to input Ethernet interface 420 in Ethernet switch 404. Output interface 440 in Ethernet switch 404 is coupled to input interface 416 in IP router 402. Output interface 436 in IP router 102 is coupled to network probe system 462.

Network probe systems 461-462 establish HRoT with one another. Network probe systems 461-462 identify IP address pairs for HRoT verification. For example, network probe systems 461-462 may provide Dynamic Host Configuration Protocol (DHCP) services and rotate blocks of IP addresses through the HRoT verification process.

Network probe system 461 transfers varying loads of IP network probe packets with one of the IP address pairs and with IP and Ethernet HRoT reporting parameters to IP router 401. In this example, probe system 161 transmits the IP network probe packets in Ethernet frames having an Ethernet HRoT reporting parameter. IP router 401 receives network probe packets with the HRoT reporting parameters into input interface 413. IP router 401 routes some of these IP packets to IP router 402 through Ethernet switches 403-404. Responsive to the IP HRoT reporting parameter, IP router 401 encodes its HW ID 451 and transfers probe response packets to network probe system 461. Responsive to the IP HRoT and/or Ethernet HRoT reporting parameter from probe system 461, IP router 401 places an Ethernet HRoT reporting parameter in the Ethernet frames transporting the IP network probe packets to Ethernet switch 403.

For example, the HRoT reporting parameter at the IP layer may comprise IP port combinations, while the HRoT reporting parameter at the Ethernet layer comprises a special Ethertype data. In another example, IP address prefix pools are associated with Ethernet MAC prefix pools, and a combination of these IP and Ethernet prefixes represent the HRoT reporting parameter at both the IP and Ethernet layers.

Ethernet switch 403 receives the Ethernet frames into input Ethernet interface 417 that have Ethernet HRoT reporting parameters and that encapsulate IP network probe packets with the IP HRoT reporting parameters. Ethernet switch 403 switches these Ethernet frames with IP probe packets to Ethernet output interface 437 based on Ethernet addressing for the Layer 2 connection between IP routers 401-402. Responsive to the IP and/or Ethernet HRoT reporting parameters, Ethernet switch 403 encodes its HW ID 453 and transfers IP probe response packets to network probe system 461. The probe response packets also indicate Ethernet interfaces 417 and 437 that were used for the probe packet transfer.

Ethernet switch 404 receives the Ethernet frames with the IP probe packets each having the HRoT reporting parameters into input Ethernet interface 420. Ethernet switch 404 switches these Ethernet frames with the IP probe packets to Ethernet output interface 440 based on Ethernet addressing for the Layer 2 connection between IP routers 401-402. Responsive to the IP and/or Ethernet HRoT reporting parameters, Ethernet switch 404 encodes its HW ID 454 and transfers IP probe response packets to network probe system 461. The probe response packets also indicate Ethernet interfaces 420 and 440 that were used for the IP probe packet transfer.

IP router 402 receives the IP network probe packets with the HRoT reporting parameters into input interface 416. IP router 402 routes these probe packets to network probe system 462. Responsive to the IP HRoT reporting parameters, IP router 402 encodes its HW ID 452 and transfers IP probe response packets to network probe system 461. Network probe system 462 also reports the IP communication path end-point to network probe system 461 responsive to the IP network probe packets.

Network probe system 461 processes the probe response packets to identify an end-to-end IP communication path for the originating IP address and the destination IP address based on the string of IP and Ethernet interfaces (413, 433, 417, 437, 420, 440, 416, and 436) and the reports from IP end-point probe system 462. Network probe system 461 then determines hardware trust status for the end-to-end IP communication path formed by these interfaces based on the encoded HW IDs 451-454 for the associated IP routers 401-402 and Ethernet switches 403-404. Network probe system 461 verifies that all reported IP and Ethernet interfaces are coupled per the network topology and use hardware with HRoT.

Referring to FIG. 5, network probe system 461 transfers varying loads of IP network probe packets to IP router 401 with an IP address pair and IP/Ethernet (ENET) HRoT reporting parameters. IP router 401 routes some of these IP packets to IP router 402 through Ethernet switches 403-404. Responsive to the IP HRoT reporting parameter, IP router 401 encodes and transfers its HW ID in probe response packets to network probe system 461 that also indicate the IP interfaces used. Responsive to the IP HRoT reporting parameter, IP router 401 places an Ethernet (ENET) HRoT reporting parameter in the Ethernet frames transporting the IP network probe packets to Ethernet switch 403.

Ethernet switch 403 receives the Ethernet frames that contain Ethernet HRoT reporting parameters and the IP network probe packets with the IP HRoT reporting parameters. Ethernet switch 403 switches these Ethernet frames with the IP probe packets to Ethernet switch 404 based on Ethernet addressing for the Layer 2 connection between IP routers 401-402. Responsive to the Ethernet HRoT reporting parameters, Ethernet switch 403 encodes its HW ID and transfers IP probe response packets to network probe system 461 that indicate the HW ID and the Ethernet interfaces used.

Ethernet switch 404 receives the Ethernet frames that contain Ethernet HRoT reporting parameters and the IP network probe packets with the IP HRoT reporting parameters. Ethernet switch 404 switches these Ethernet frames with the IP probe packets to IP router 402 based on Ethernet addressing for the Layer 2 connection between IP routers 401-402. Responsive to the Ethernet HRoT reporting parameters, Ethernet switch 404 encodes its HW ID and transfers IP probe response packets to network probe system 461 that indicate the HW ID and the Ethernet interfaces used.

IP router 402 receives the IP network probe packets with the HRoT reporting parameters. IP router 402 routes these probe packets to network probe system 462. Responsive to the IP HRoT reporting parameters, IP router 402 encodes its HW ID and transfers IP probe response packets to network probe system 461 indicating the encoded HW ID and the IP interfaces used.

Network probe system 462 receives the IP network probe packets with the HRoT reporting parameters. Responsive to the IP network probe packets, network probe system 462 reports to network probe system 461 that the end-point for the IP communication path has been reached.

Network probe system 461 processes the probe response packets to identify an end-to-end IP communication path for the originating IP address and the destination IP address based on the reports from routers 401-402, Ethernet switches 403-404, and probe system 462. Network probe system 461 then determines hardware trust status for the end-to-end IP communication path formed by these interfaces based on the encoded HW IDs for the associated IP routers 401-402 and Ethernet switches 403-404. Network probe system 461 verifies that all reported IP and Ethernet interfaces are coupled per the network topology and use hardware with HRoT.

Figure 6:
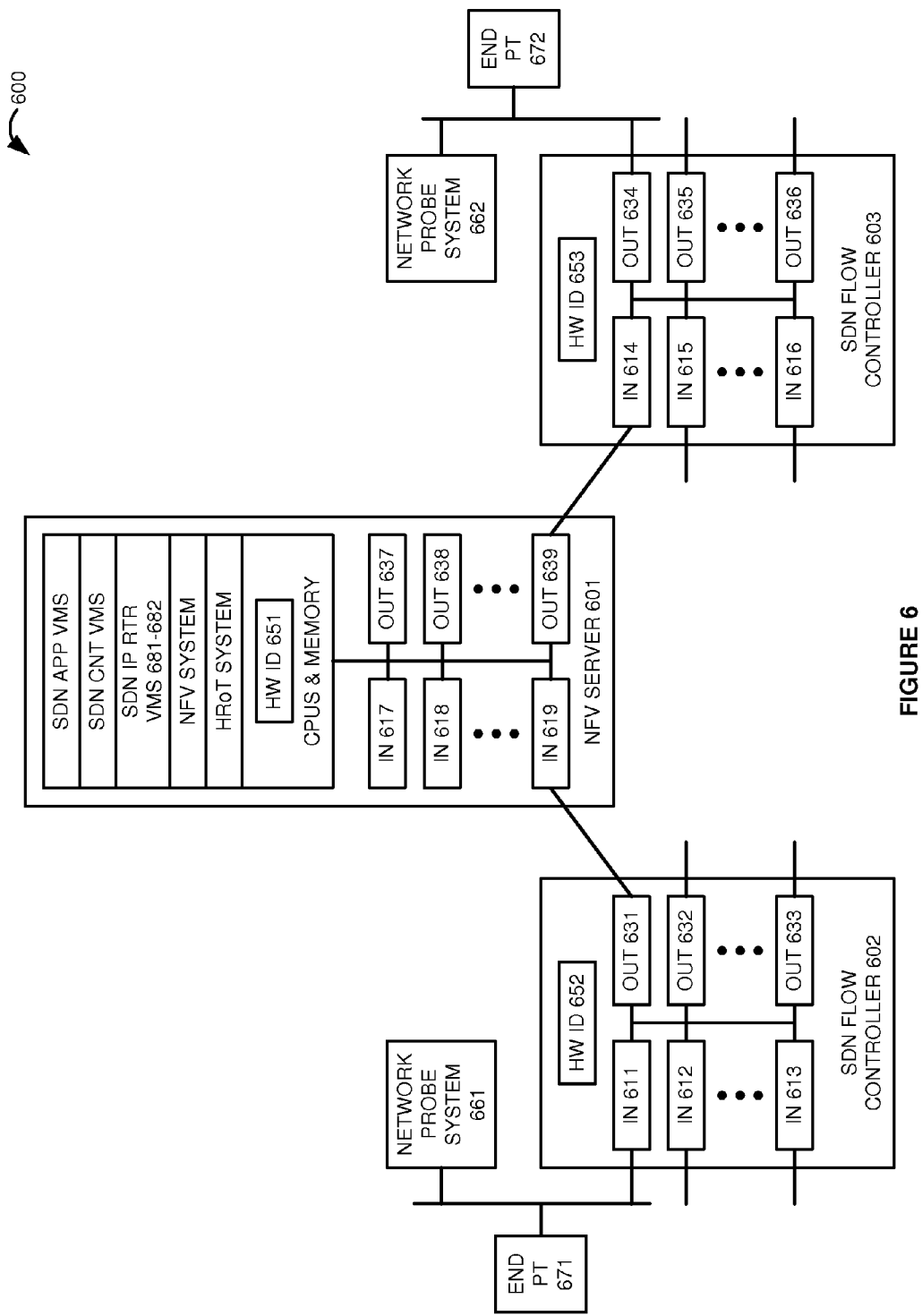
FIGS. 6-7 illustrates a data communication system to integrate HRoT for IP communication paths that traverse Network Function Virtualization (NFV) servers and Software-Defined Network (SDN) IP flow controllers.
Figure 7:
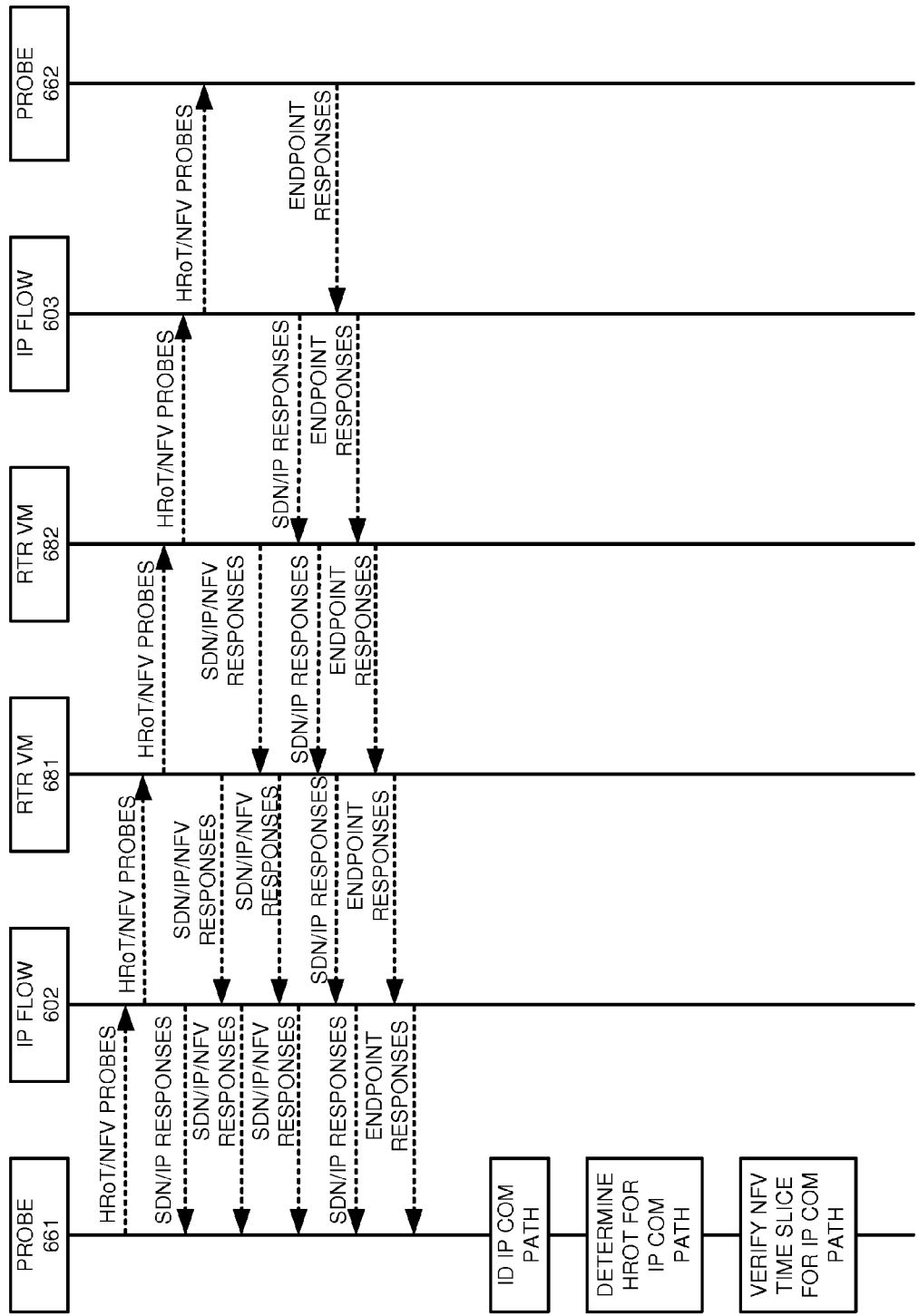

FIGS. 6-7 illustrate data communication system 600 to integrate HRoT for IP communication paths that traverse NFV server 601 and SDN flow controllers 602-603. Data communication system 600 comprises NFV server 601, SDN flow controllers 602-603, and network probe systems 661-662. Data communication system 600 is configured to operate according to SDN and NFV standards.

SDN flow controllers 602-603 include respective SDN/IP input interfaces 611-616 and SDN/IP output interfaces 631-636. SDN flow controllers 602-603 include respective HW IDs 652-653. SDN flow controllers 602-603 comprise physical IP routing machines that direct individual flows of IP packets from incoming interfaces to outgoing interfaces based on IP flow tables. SDN flow controllers 602-603 may also apply packet-level features such as header translation, media transcoding, payload inspection, caching, and the like based on the flow tables. The SDN controller VMs in NFV server 601 use southbound SDN interfaces to load the flow tables in SDN flow controllers 602-603.

NFV server 601 includes respective SDN/IP input interfaces 617-619 and SDN/IP output interfaces 637-639. Output SDN/IP interface 631 in SDN flow controller 602 is coupled to input SDN/IP interface 619 in NFV server 601. Output SDN/IP interface 639 in NFV server 601 is coupled to input SDN/IP interface 614 in SDN flow controller 603. SDN/IP interfaces 611-619 and 631-639 comprise physical SDN communication ports.

NFV server 601 comprises Central Processing Units (CPUs), memory devices, and communication circuitry to couple SDN/IP input interfaces 617-619 with SDN/IP output interfaces 637-639. The communication circuitry and interfaces in NFV server 601 may be similar to an SDN IP flow controller. The hardware in NFV server 601 (CPUs, memory devices, communication circuitry, and the like) has a physically-embedded HW ID 651.

NFV server 601 includes an HRoT system. The HRoT system includes portions of the circuitry, memory, and interfaces in NFV server 601. The HRoT system establishes and maintains physical control over software and data access to the hardware in NFV server 601. The HRoT system establishes the direct physical control by loading trust software during NFV server 601 initialization. The HRoT system includes physical switching to couple and de-couple select components in NFV server 601, such as select CPUs, memory devices, interfaces, and the like. The HRoT system may use the switching to read HW ID 651 that is embedded within NFV server 601. The HRoT system exchanges trust data with other HRoT systems using a hash of HW ID 651 to validate itself. The HRoT system hosts trust data to validate HRoT systems in SDN flow controllers 602-603.

NFV server 601 has an NFV system comprising hypervisor software and context switching support in the CPUs and memory. The hypervisor software directs NFV server 601 to operate in a virtualized manner to support the execution of virtual machines or containers in a multi-threaded and time-sliced manner. This particular example uses Virtual Machines (VMs) but containers could be used. The hypervisor software implements context switching to isolate virtual communication networks of VMs that are executing on NFV server 601. The hypervisor software uses SDN IP router VMs 681-682 executing in NFV server 601 to route IP packets between physical SDN/IP interfaces 617-619 and 637-639.

In the SDN application plane of NFV server 601, the SDN application VMs use SDN Application Programming Interfaces (APIs) to exchange application data with the SDN controller VMs over northbound SDN interfaces. An exemplary list of SDN application VMs includes Virtual Private Network (VPN) servers, Internet Multimedia Subsystem (IMS) servers, authorization databases, network gateways, access node controllers, and the like. The SDN controller VMs process the application data to control flow tables in the SDN plane over southbound SDN interfaces. The SDN data plane comprises SDN flow controllers 602-603 and SDN IP router VMs 681-682—when VMs 681-682 are executing in NFV server 601. Thus, the SDN applications direct the SDN controllers to load the SDN flow tables in both SDN flow controllers 602-603 and SDN IP router VMs 681-682. Additional SDN data plane VMs are implemented in the manner of IP router VMs 681-682, such as IP header processors, Deep Packet Inspection (DPI) units, media transcoders, virtual Layer 2 switches, virtual SDN flow controllers, and the like.

Network probe systems 661-662 include HRoT, NFV, DHCP, IP probe, and network topology components. Network probe systems 661-662 establish HRoT with one another and identify IP address pairs for HRoT/NFV verification. Network probe system 461 is coupled to input SDN/IP interface 611 in SDN flow controller 602. Output SDN/IP interface 634 in SDN flow controller 603 is coupled to network probe system 662.

Network probe system 661 transfers varying loads of IP network probe packets with one of the IP address pairs and with HRoT/NFV reporting parameters to SDN flow controller 602. SDN flow controller 602 receives the network probe packets with the HRoT/NFV reporting parameters into input interface 611. SDN flow controller 602 routes some of these IP network probe packets to SDN IP router VM 681 in NFV server 601. Responsive to the IP HRoT/NFV reporting parameters, SDN flow controller 602 encodes its HW ID 652 and transfers probe response packets to network probe system 661 that indicate encoded HW ID 652 and interfaces 611 and 631. In situations where SDN flow controller 602 is virtualized, virtual SDN flow controller 602 obtains and reports its NFV time slice from its NFV system responsive to the IP NFV reporting parameter.

NFV server 601 receives the IP network probe packets with the IP HRoT/NFV reporting parameters into input SDN/IP interface 619. SDN IP router VM 681 routes the IP probe packets to SDN IP router VM 682 based on its flow table. Responsive to the IP HRoT reporting parameter, SDN IP router VM 681 obtains encoded HW ID 651 from the HRoT system in NFV server 601. Responsive to the IP NFV reporting parameter, SDN IP router VM 681 obtains its NFV time slice from the NFV system in NFV server 601. SDN IP router VM 681 may also obtain input/output SDN/IP interface data from NFV server 601. SDN IP router VM 681 transfers IP probe response packets to network probe system 661 that indicate the encoded HW ID, NFV time slice, input interface 619, and virtual SDN/IP interface to VM 682.

SDN IP router VM 682 routes the IP probe packets to SDN flow controller 603 based on its flow table. Responsive to the IP HRoT reporting parameter, SDN IP router VM 682 obtains encoded HW ID 651 from the HRoT system. Responsive to the IP NFV reporting parameter, SDN IP router VM 682 obtains its NFV time slice from the NFV system. SDN IP router VM 682 may also obtain input/output SDN/IP interface data from NFV server 601. SDN IP router VM 682 transfers IP probe response packets to network probe system 661 that indicate the encoded HW ID, NFV time slice, virtual SDN/IP interface to VM 681, and output interface 639.

SDN flow controller 603 receives the IP network probe packets with the HRoT reporting parameters into input interface 614. SDN flow controller 603 routes these probe packets to network probe system 662 based on its flow table. Responsive to the IP HRoT reporting parameters, SDN flow controller 603 encodes its HW ID 653 and transfers IP probe response packets to network probe system 661. Network probe system 662 also reports the IP communication path end-point to network probe system 661 responsive to the IP network probe packets. In situations where SDN flow controller 603 is virtualized, virtual SDN flow controller 603 obtains and reports its NFV time slice from its NFV system responsive to the IP NFV reporting parameter.

Network probe system 661 processes the probe response packets to identify an end-to-end IP communication path for the originating IP address and the destination IP address based on the string of SDN/IP interfaces and the reports from IP end-point probe system 662. Network probe system 661 then determines hardware trust status for the end-to-end IP communication path formed by these interfaces based on the encoded HW IDs 651-653 reported from SDN flow controllers 602-603 and IP router VMs 681-682. Network probe system 661 verifies that all reported SDN/IP interfaces are coupled per the network topology and use hardware with HRoT.

Network probe system 661 also determines NFV trust status for the end-to-end IP communication path formed by these interfaces based on the NFV time slices reported from SDN flow controllers 602-603 and IP router VMs 681-682. Network probe system 661 verifies that all reported NFV time slices are used per target NFV time slice data for the given network elements.

Referring to FIG. 7, network probe system 661 transfers varying loads of IP network probe packets having an IP address pair and HRoT/NFV reporting parameters to SDN flow controller 602. SDN flow controller 602 routes some of these IP network probe packets to SDN IP router VM 681 in NFV server 601 based on its flow table. Responsive to the IP HRoT reporting parameter, SDN flow controller 602 encodes its HW ID 652 and transfers probe response packets to network probe system 661 that indicate encoded HW ID 652 and the input and output interfaces used for the transfer.

SDN IP router VM 681 receives the IP network probe packets that have IP HRoT/NFV reporting parameters from input SDN/IP interface 619. SDN IP router VM 681 routes the IP probe packets to SDN IP router VM 682 based on its flow table. Responsive to the IP HRoT reporting parameter, SDN IP router VM 681 obtains encoded HW ID 651 from the HRoT system. Responsive to the IP NFV reporting parameter, SDN IP router VM 681 obtains its NFV Time Slice (TS) from the NFV system. SDN IP router VM 681 and transfers IP probe response packets to network probe system 661 that indicate the encoded HW ID, NFV time slice, and the input and output interfaces used for the transfer.

SDN IP router VM 682 routes the IP probe packets to SDN flow controller 603 based on its flow table. Responsive to the IP HRoT reporting parameter, SDN IP router VM 682 obtains encoded HW ID 651 from the HRoT system. Responsive to the IP NFV reporting parameter, SDN IP router VM 682 obtains its NFV time slice from the NFV system. SDN IP router VM 682 transfers IP probe response packets to network probe system 661 that indicate the encoded HW ID, NFV time slice, and the input and output interfaces used for the transfer.

SDN flow controller 603 routes the IP network probe packets to network probe system 662 based on its flow table. Responsive to the IP HRoT reporting parameters, SDN flow controller 603 encodes its HW ID 653 and transfers IP probe response packets to network probe system 661 indicating the encoded HW ID and the input and output interfaces used for the transfer. Network probe system 662 also reports the IP communication path end-point to network probe system 661 responsive to the IP network probe packets.

Network probe system 661 processes the probe response packets to identify an end-to-end IP communication path for the originating IP address and the destination IP address based on the string of SDN/IP interfaces and the reports from IP end-point probe system 662. Network probe system 661 then determines hardware trust status for the end-to-end IP communication path formed by these interfaces based on the encoded HW IDs 651-653 reported from the SDN flow controllers 602-603 and IP router VMs 681-682. Network probe system 661 verifies that all reported SDN/IP interfaces are coupled per the network topology and use hardware with HRoT.

Network probe system 661 also determines NFV trust status for the end-to-end IP communication path formed by these interfaces based on the NFV time slices reported from SDN IP router VMs 681-682. Network probe system 661 verifies that all reported NFV time slices are used per target NFV time slice data for the given VMs on the IP communication path.

Figure 8:
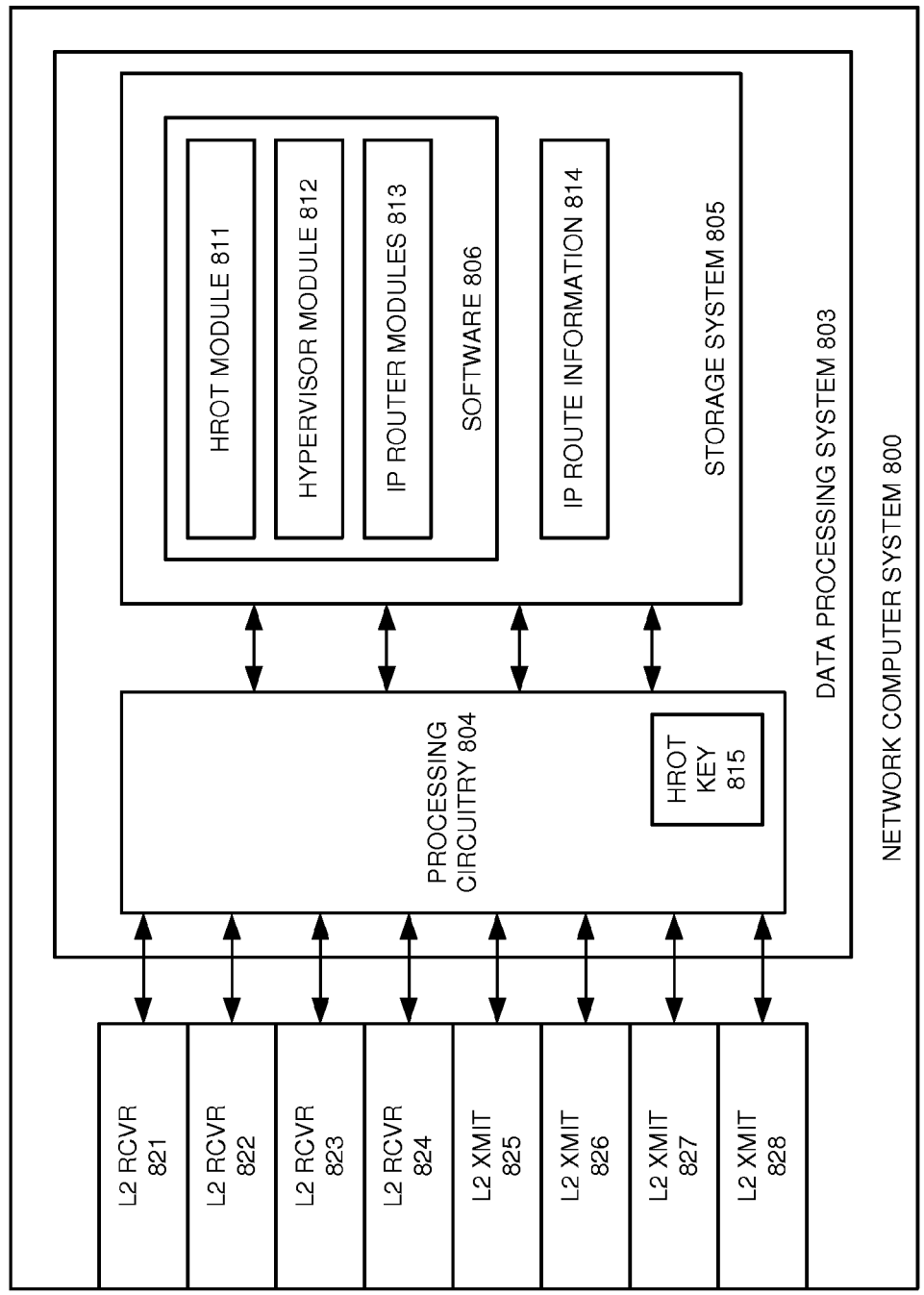
FIGS. 8-9 illustrate network computer systems to integrate IP, HRoT, and NFV systems.

FIG. 8 illustrates network computer system 800 to integrate IP, HRoT, and NFV systems. Network computer system 800 is an example of IP routers 101-104 and 401-402, Ethernet switches 403-404, and SDN flow controllers 601-602, although these systems may use alternative configurations and operations. Network computer system 800 comprises data processing system 803, Layer 2 receivers 821-824, and Layer 2 transmitters 825-828. Communication receivers 821-824 and transmitters 825-828 comprise physical ports, digital signal processors, memory devices, software, bus interfaces, and the like. Communication receivers 821-824 and transmitters 825-828 exchange IP packets having HRoT/NFV reporting parameters and response data.

Data processing system 803 comprises processing circuitry 804 and storage system 805. HRoT key 815 is physically embedded in an electronically readable form from processing circuitry 804. Storage system 805 stores software 806 and IP route information 814. Software 806 includes software modules 811-813. Some conventional aspects of computer system 800 are omitted for clarity, such as power supplies, enclosures, and the like. Network computer system 800 may be centralized or distributed.

In data processing system 803, processing circuitry 804 comprises server blades, circuit boards, bus interfaces and connections, integrated circuitry, and associated electronics. Storage system 805 comprises non-transitory, machine-readable, data storage media, such as flash drives, disc drives, memory circuitry, tape drives, servers, and the like. Software 806 comprises machine-readable instructions that control the operation of processing circuitry 804 when executed. Software 806 includes software modules 811-813 and may also include operating systems, applications, data structures, virtual machines, utilities, databases, and the like. All or portions of software 806 may be externally stored on one or more storage media, such as circuitry, discs, tape, and the like.

When executed by processing circuitry 804, HRoT module 811 directs circuitry 804 to maintain HRoT with the hardware comprising each of receivers 821-824 and transmitters 825-828. HRoT module 811 also directs circuitry 804 to provide an encoded version of HRoT key 815 to hypervisor module 812 and/or IP router modules 813. HRoT module 811 also directs circuitry 804 to execute hypervisor module 812. When executed by processing circuitry 804, hypervisor module 812 directs circuitry 804 to operate an NFV data processing environment for IP router modules 813 and to supply NFV time slice data and perhaps encoded HRoT key 815.

When executed by processing circuitry 804 in the NFV time slices, IP router modules 813 direct circuitry 804 to transfer IP packets from Layer 2 receivers 821-824 to Layer 2 transmitters 825-828 based on IP addresses and IP route information 814. Responsive to HRoT/NFV reporting parameters in the IP headers, IP router modules 813 also direct circuitry 804 to obtain encoded HRoT key 815 from HRoT module 811 (through hypervisor module 812) and obtain NFV time slice data from hypervisor module 812. Responsive to HRoT/NFV reporting parameters in the IP headers, IP router modules 813 also direct circuitry 804 to generate and transfer IP response messages indicating the encoded HRoT key 815, the NFV time slice data, and the individual Layer 2 receivers and transmitters used for the IP packet transfer.

Figure 9:
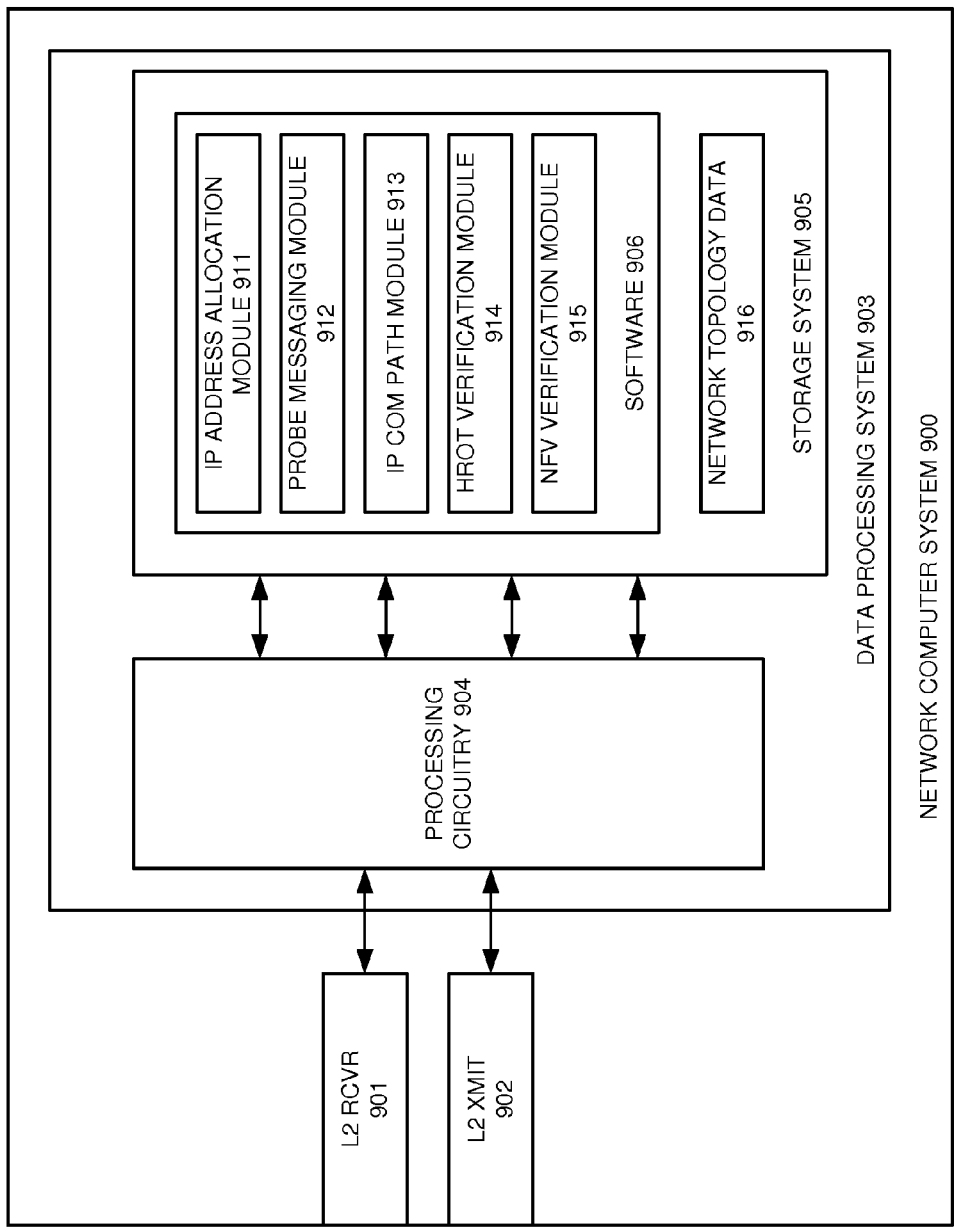

FIG. 9 illustrates network computer system 900 to integrate IP, HRoT, and NFV systems. Network computer system 900 is an example of probe systems 161-162, 461-462, and 661-662, although these systems may use alternative configurations and operations. Network computer system 900 comprises data processing system 903, Layer 2 receiver 901, and Layer 2 transmitter 902. Layer 2 receiver 901 and transmitter 902 comprise physical ports, digital signal processors, memory devices, software, bus interfaces, and the like. Layer 2 receiver 901 and transmitter 902 exchange IP packets having HRoT/NFV reporting parameters and response data.

Data processing system 903 comprises processing circuitry 904 and storage system 905. Storage system 905 stores software 906 and network topology data 916. Software 906 includes software modules 911-915. Some conventional aspects of computer system 900 are omitted for clarity, such as power supplies, enclosures, and the like. Network computer system 900 may be centralized or distributed.

In data processing system 903, processing circuitry 904 comprises server blades, circuit boards, bus interfaces and connections, integrated circuitry, and associated electronics. Storage system 905 comprises non-transitory, machine-readable, data storage media, such as flash drives, disc drives, memory circuitry, tape drives, servers, and the like. Software 906 comprises machine-readable instructions that control the operation of processing circuitry 904 when executed. Software 906 includes software modules 911-915 and may also include operating systems, applications, data structures, virtual machines, utilities, databases, and the like. All or portions of software 906 may be externally stored on one or more storage media, such as circuitry, discs, tape, and the like.

When executed by processing circuitry 904, IP address allocation module 911 identifies IP address pairs for HRoT and NFV verification. When executed by processing circuitry 904, probe messaging module 912 directs circuitry 904 to transmit IP probe packets having the identified IP address pair and HRoT/NFV reporting parameters. When executed by processing circuitry 904, IP communication path module 913 directs circuitry 904 to identify IP communication paths based on received probe response messages and network topology data 916. When executed by processing circuitry 904, HRoT verification module 914 directs circuitry 904 to generate HRoT results for the network elements on the IP communications path and compare them to the reported and encoded HRoT HW IDs. HRoT verification module 914 also directs circuitry 904 to match the reported communication interfaces to the network topology data 916 to account for all IP probe packet transfers. When executed by processing circuitry 904, NFV verification module 915 directs circuitry 904 to compare reported NFV time slices for reporting routers, switches, and controllers to their target time slices as indicated by network topology data 916.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a data communication system to determine hardware trust for Internet Protocol (IP) communications, the method comprising:
   in a network probe system, transferring network probe packets having an originating IP address, a destination IP address, and an IP Hardware Root-of-Trust (HRoT) reporting parameter;
   in a plurality of IP routers, receiving the network probe packets through IP input interfaces, routing the probe packets from the IP input interfaces to IP output interfaces based on the destination IP address, and responsive to the IP HRoT reporting parameter, encoding IP router Hardware Identifiers (HW IDs) and transferring probe response packets to the network probe system that indicate the encoded IP router HW IDs, the IP input interfaces, and the IP output interfaces; and
   in the network probe system, processing the probe response packets to identify an end-to-end IP communication path for the originating IP address and the destination IP address based on the IP input interfaces and the IP output interfaces and responsively determining hardware trust status for the end-to-end IP communication path based on the encoded IP router HW IDs.

2. The method of claim 1 wherein determining the hardware trust status for the end-to-end IP communication path further comprises determining if all of reported ones of the IP output interfaces are coupled to reported ones of the IP input interfaces or IP address endpoints.

3. The method of claim 1 wherein the IP HRoT reporting parameter comprises an IP port number.

4. The method of claim 1 further comprising:
   in a plurality of Software Defined Network (SDN) IP flow controllers that connect the IP routers, receiving the network probe packets through flow controller input interfaces, forwarding the network probe packets from the flow controller input interfaces to flow controller output interfaces, and responsive to the IP HRoT reporting parameter, encoding IP flow controller HW IDs and transferring additional probe response packets to the network probe system that indicate the encoded IP flow controller HW IDs, the flow controller input interfaces, and the flow controller output interfaces; and
   the network probe system processing the additional probe response packets to identify an end-to-end SDN communication path for the end-to-end IP communication path based on the flow controller input interfaces and the flow controller output interfaces and responsively determining the hardware trust status for the end-to-end IP communication path also based on the encoded IP flow controller HW IDs.

5. The method of claim 4 wherein determining the hardware trust status for the end-to-end IP communication path further comprises determining if all reported ones of the flow controller output interfaces are coupled to reported ones of the flow controller input interfaces or IP address endpoints.

6. The method of claim 5 wherein the IP HRoT reporting parameter comprises an IP port number.

7. The method of claim 1 further comprising:
   the network probe system transferring the network probe packets in Ethernet frames having an Ethernet HRoT reporting parameter;
   in a plurality of Ethernet switches that connect the IP routers, receiving the network probe packets through Ethernet input interfaces, switching the Ethernet packets from the Ethernet input interfaces to Ethernet output interfaces, and responsive to the Ethernet HRoT reporting parameter, encoding Ethernet switch HW IDs and transferring additional probe response packets to the network probe system that indicate the encoded Ethernet switch HW IDs, the Ethernet input interfaces, and the Ethernet output interfaces; and the network probe system, processing the additional probe response packets to identify an end-to-end Ethernet communication path for the end-to-end IP communication path based on the Ethernet input interfaces and the Ethernet output interfaces and responsively determining the hardware trust status for the end-to-end IP communication path also based on the encoded Ethernet switch HW IDs.

8. The method of claim 7 wherein determining the hardware trust status for the end-to-end IP communication path comprises determining if all reported ones of the Ethernet output interfaces are coupled to reported ones of the Ethernet input interfaces or IP address endpoints.

9. The method of claim 1 further comprising
the network probe system transferring the network probe packets having a Network Function Virtualization (NFV) reporting parameter;
the IP routers identifying their NFV time slices response to the NFV reporting parameter and indicating the NFV time slices in the probe response packets; and
in the network probe system, determining NFV trust status for the end-to-end IP communication path based on the NFV time slice indications for the IP routers.

10. The method of claim 9 wherein the NFV reporting parameter comprises an IP port number.

11. A data communication system to determine hardware trust for Internet Protocol (IP) communications, the data communication system comprising:
a network probe system configured to transfer network probe packets having an originating IP address, a destination IP address, and an IP Hardware Root-of-Trust (HRoT) reporting parameter;
a plurality of IP routers configured to receive the network probe packets through IP input interfaces, route the probe packets from the IP input interfaces to IP output interfaces based on the destination IP address, and responsive to the IP HRoT reporting parameter, encode IP router Hardware Identifiers (HW IDs) and transfer probe response packets to the network probe system that indicate the encoded IP router HW IDs, the IP input interfaces, and the IP output interfaces; and
the network probe system configured to process the probe response packets to identify an end-to-end IP communication path for the originating IP address and the destination IP address based on the IP input interfaces and the IP output interfaces and responsively determine hardware trust status for the end-to-end IP communication path based on the encoded IP router HW IDs.

12. The data communication system of claim 11 wherein the network probe system is configured to determine if all reported ones of the IP output interfaces are coupled to reported ones of the IP input interfaces or IP address endpoints.

13. The data communication system of claim 11 wherein the IP HRoT reporting parameter comprises an IP port number.

14. The data communication system of claim 11 further comprising:
a plurality of Software Defined Network (SDN) IP flow controllers that connect the IP routers and that are configured to receive the network probe packets through flow controller input interfaces, forward the network probe packets from the flow controller input interfaces to flow controller output interfaces, and responsive to the IP HRoT reporting parameters, encode IP flow controller HW IDs and transfer additional probe response packets to the network probe system that indicate the encoded IP flow controller HW IDs, the flow controller input interfaces, and the flow controller output interfaces; and
the network probe system configured to process the additional probe response packets to identify an end-to-end SDN communication path for the end-to-end IP communication path based on the flow controller input interfaces and the flow controller output interfaces and responsively determine the hardware trust status for the end-to-end IP communication path also based on the encoded IP flow controller HW IDs.

15. The data communication system of claim 14 wherein the network probe system is configured to determine if all reported ones of the flow controller output interfaces are coupled to reported ones of the flow controller input interfaces or IP address endpoints.

16. The data communication system of claim 15 wherein the IP HRoT reporting parameter comprises an IP port number.

17. The data communication system of claim 11 further comprising:
the network probe system transferring the network probe packets having an Ethernet HRoT reporting parameter;
a plurality of Ethernet switches that connect the IP routers and that are configured to receive the network probe packets through Ethernet input interfaces, switch the Ethernet packets from the Ethernet input interfaces to Ethernet output interfaces, and responsive to the Ethernet HRoT reporting parameter, encode Ethernet switch HW IDs and transfer additional probe response packets to the network probe system that indicate the encoded Ethernet switch HW IDs, the Ethernet input interfaces, and the Ethernet output interfaces; and
the network probe system is further configured to process the additional probe response packets to identify an end-to-end Ethernet communication path for the end-to-end IP communication path based on the Ethernet input interfaces and the Ethernet output interfaces and responsively determine the hardware trust status for the end-to-end IP communication path also based on the encoded Ethernet switch HW IDs.

18. The data communication system of claim 17 wherein the network probe system configured to determine if all reported ones of the Ethernet output interfaces are coupled to reported ones of the Ethernet input interfaces or IP address endpoints.

19. The data communication system of claim 11 wherein:
the network probe system is configured to transfer the network probe packets having a Network Function Virtualization (NFV) reporting parameter;
the IP routers are configured to identify their NFV time slices response to the NFV reporting parameter and indicate the NFV time slices in the probe response packets; and
the network probe system is configured to determine NFV trust status for the end-to-end IP communication path based on the NFV time slice indications for the IP routers.

20. The data communication system of claim 19 wherein the NFV reporting parameter comprises an IP port number.

* * * * *